（12）United States Patent
Ikeda

(10) Patent No.: US 9,762,752 B2
(45) Date of Patent: Sep. 12, 2017

(54) IMAGE FORMING APPARATUS, IMAGE FORMING METHOD, AND STORAGE MEDIUM FOR VISUAL GRADATION CORRECTION

(71) Applicant: CANON KABUSHIKI KAISHA, Tokyo (JP)

(72) Inventor: Sanae Ikeda, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/965,100

(22) Filed: Dec. 10, 2015

(65) Prior Publication Data

US 2016/0173735 A1 Jun. 16, 2016

(30) Foreign Application Priority Data

Dec. 16, 2014 (JP) .................................. 2014-254598

(51) Int. Cl.
*H04N 1/00* (2006.01)
*H04N 1/405* (2006.01)
*H04N 1/60* (2006.01)

(52) U.S. Cl.
CPC ..... *H04N 1/00087* (2013.01); *H04N 1/00023* (2013.01); *H04N 1/00034* (2013.01); *H04N 1/00045* (2013.01); *H04N 1/4051* (2013.01); *H04N 1/6041* (2013.01)

(58) Field of Classification Search
None
See application file for complete search history.

(56) References Cited

U.S. PATENT DOCUMENTS

| 4,310,248 | A | * | 1/1982 | Meredith | B41F 33/0036 356/402 |
| 5,170,257 | A | * | 12/1992 | Burns | B41B 27/00 358/3.21 |
| 5,598,272 | A | * | 1/1997 | Fisch | B41F 33/0036 347/19 |
| 5,636,330 | A | * | 6/1997 | Barak | B41F 33/0027 358/1.1 |

(Continued)

FOREIGN PATENT DOCUMENTS

JP 4697317 B2 6/2011

*Primary Examiner* — Paul F Payer
(74) *Attorney, Agent, or Firm* — Canon U.S.A., Inc. IP Division

(57) ABSTRACT

An image forming apparatus includes a forming unit configured to form a set of reference patches corresponding to different density regions through an image forming unit while making the reference patches correspond to screen types, an input unit configured to input a comparison result between each of the reference patches and criterial patches having densities as criteria at each of the screen types, and a generation unit configured to generate information for correcting a density of an image formed by the image forming unit at each of the screen types by using the comparison result input by the input unit, wherein the information generated by the generation unit for correcting an image in a highest density region from among the density regions is commonly generated according to the comparison result input with respect to each of the reference patches formed at each of the screen types.

9 Claims, 13 Drawing Sheets

(56) References Cited

U.S. PATENT DOCUMENTS

| | | | | |
|---|---|---|---|---|
| 5,936,741 A * | 8/1999 | Burns | ............... | B41B 27/00 358/1.9 |
| 6,030,066 A * | 2/2000 | Li | ............... | B41J 29/393 347/19 |
| 6,256,111 B1 * | 7/2001 | Rijavec | ............... | G06K 15/02 358/1.13 |
| 6,606,167 B1 * | 8/2003 | Rees | ............... | H04N 1/4078 358/1.9 |
| 8,175,483 B2 * | 5/2012 | Shiraki | ............... | G03G 15/5062 399/138 |
| 9,179,044 B2 * | 11/2015 | Zeng | ............... | H04N 1/6033 |

* cited by examiner

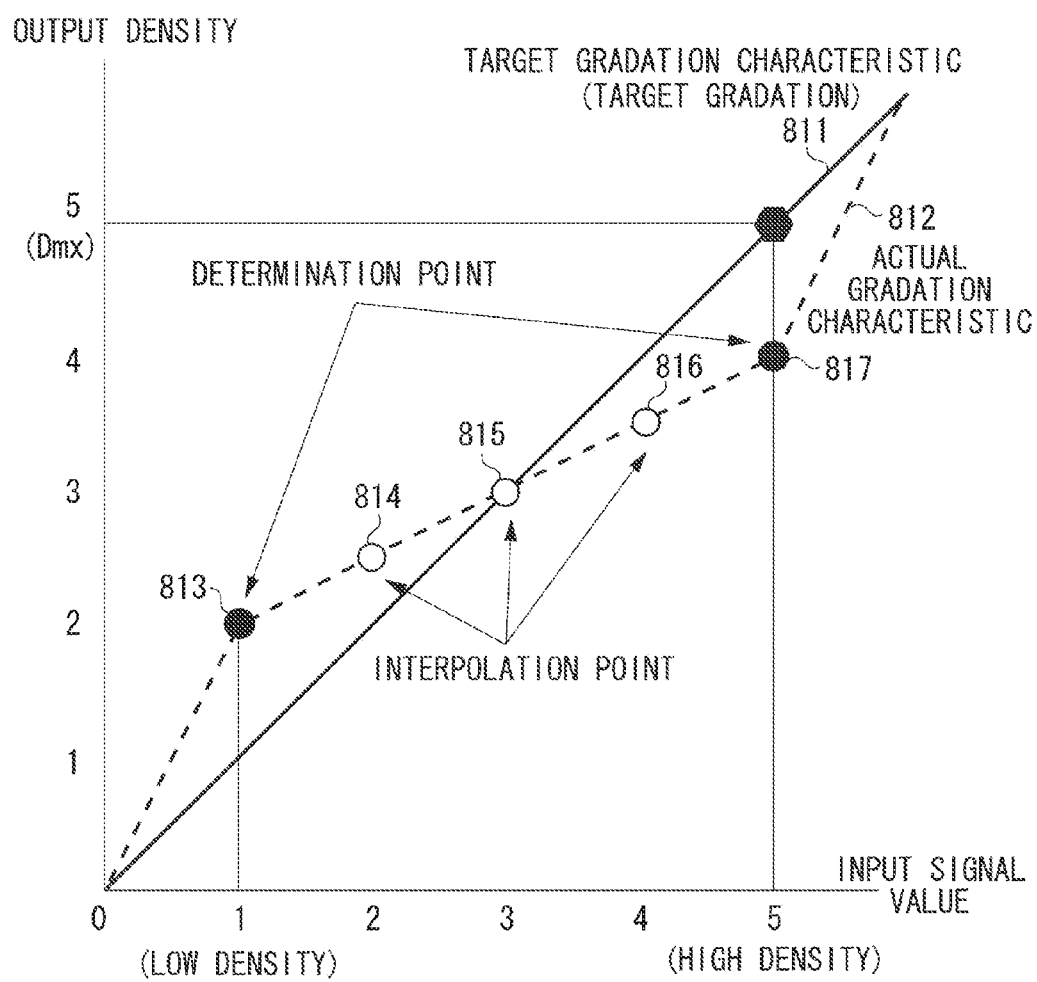

FIG. 8B

| | INPUT | TARGET | DETERMINATION | CORRECTION |
|---|---|---|---|---|
| 821 | 1 | 1 | 2 | −1 |
| 822 | 2 | 2 | (INTERPOLATION) | −0.5 |
| 823 | 3 | 3 | (INTERPOLATION) | 0 |
| 824 | 4 | 4 | (INTERPOLATION) | +0.5 |
| 825 | 5 | 5 | 4 | +1 |

FIG. 8C

| | INPUT | TARGET | DETERMINATION | CORRECTION |
|---|---|---|---|---|
| 831 | 1 | 1 | 1 | 0 |
| 832 | 2 | 2 | (INTERPOLATION) | −0.5 |
| 833 | 3 | 3 | (INTERPOLATION) | 0 |
| 834 | 4 | 4 | (INTERPOLATION) | +0.5 |
| 835 | 5 | 5 | 4 | +1 |

FIG. 8D

| | INPUT | TARGET | DETERMINATION | CORRECTION |
|---|---|---|---|---|
| 841 | 1 | 1 | 2→1 | -1→0 |
| 842 | 2 | 2 | (INTERPOLATION) | -0.5 |
| 843 | 3 | 3 | (INTERPOLATION) | 0 |
| 844 | 4 | 4 | (INTERPOLATION) | +0.5 |
| 845 | 5 | 5 | 5→4 | 0→+1 |

FIG. 8E

| | LEFT AREA | CENTRAL AREA | RIGHT AREA | |
|---|---|---|---|---|
| CENTER VALUE (HIGH DENSITY REGION) | 4 | | | ~851 |
| DIFFERENCE | 0 | 0 | -1 | |
| | 852 | 853 | 854 | |

IMAGE FORMING APPARATUS, IMAGE FORMING METHOD, AND STORAGE MEDIUM FOR VISUAL GRADATION CORRECTION

BACKGROUND OF THE INVENTION

Field of the Invention

The present disclosure generally relates to image forming and, more particularly, to an image forming apparatus, an image forming method for making an adjustment on gradation characteristics of an image forming apparatus, and a storage medium.

Description of the Related Art

Generally, a gradation characteristic of an image forming apparatus such as a color printer or a multifunction peripheral is changed because of temporal change, environmental change, or individual variability of the apparatus. In order to maintain gradation of an output document output from the image forming apparatus in a preferable state, techniques known as calibration and gradation correction have been known as the methods for correcting the gradation characteristic that is to be changed because of the above-described factor.

In the techniques, at first, reference patches including a gradation pattern in which gradations of colors used for image formation are gradually changed and criterial patches including a density pattern serving as a criterion are compared visually or compared by using a measurement device. Then, an output characteristic of a color of an image output from the image forming apparatus is corrected by using a comparison result. In order to execute the above correction, visual gradation correction in which an amount of color deviation is visually determined by a user without using a scanner or a measurement device is employed if there is a demand for a simple adjustment method at low cost. In the visual gradation correction, from among the patches (criterial patches) in a plurality of gradations serving as criteria printed on a sample chart, the user selects a patch the density of which conforms to that of a determination patch (reference patch) included in a confirmation chart formed by the image forming apparatus serving as a correction target.

Japanese Patent No. 4697317 discusses a method in which a user visually makes a determination by printing the criterial patches and the reference patches on a same sheet.

In the above-described gradation correction processing of the image forming apparatus, the criterial patches and the reference patches are used at each color regarded as a processing unit of the gradation correction. Further, in order to precisely determine a patch density to improve correction precision, for example, there is provided a known method in which a combination of reference patches in low, medium, and high densities are printed at each color as a gradation correction confirmation chart. At this time, although the number of gradations of the reference patches is optionally specified within a range of 1 to the number that is equal to the number of gradations of the criterial patches, the correction precision is increased if a greater number that is within a range where the user can visually make a determination is specified as the number of gradations thereof. Further, screen processing is generally employed as an image forming method for creating gradations through the image forming apparatus such as a color printer or a multifunction peripheral. Since the color gradation is created according to the number or the density of color dots (color lines) that constitute a screen, the gradation characteristic may vary according to the number or the density thereof. Therefore, it is necessary to execute the gradation correction processing at each screen type. For example, the gradation characteristic becomes different in low line number screen processing and high line number screen processing. Accordingly, the user has to execute the gradation correction processing by using a result of the comparison between the reference patches including respective screens and the criterial patches. Thus, in the above-described gradation correction processing, the number of comparison operations of the criterial patch and the reference patch executed by the user is equivalent to the number of reference patches. Specifically, the number of comparison operations is a value equivalent to a product of the number of colors, the number of screen types, and the number of gradations of the reference patch.

As described above, although a patch configuration of a minimum in which a single patch is used for each determination is employed, the number of reference patches is increased according to the number of colors or screen types. The number of comparison operations is further increased if the number of gradations of the reference patch is increased in order to improve the correction precision.

In the image forming apparatus of a certain printing system, an output density may slightly vary in one printed sheet depending on a position or a peripheral image. For example, in a case where the image forming apparatus is operated in an electro-photographic system, a density difference may occur in a central portion and end portions of a sheet in a scanning direction of a laser, or density deviation may occur in a sub-scanning direction at a rotation cycle of a drum. In a case where the above-described variation of density (hereinafter, referred to as "in-plane deviation") depending on a position within the sheet occurs in the confirmation chart, the reference patches may not be printed appropriately depending on the printing position. As a result, a correct determination result cannot be acquired from the comparison between the criterial patch and the reference patch, and thus the correction precision will be lowered.

Therefore, in order to absorb a determination error caused by the in-plane deviation, in the gradation correction processing, a plurality of reference patches of the same type are arranged in different positions of the confirmation chart, and a correction value is determined based on a plurality of determination results.

Through this method, a determination error resulting from a printing position of the reference patch can be absorbed. Therefore, in the gradation correction processing for determining a difference between the reference patch automatically read by the measurement device and the criterion, the above method is used as an effective method for reducing the influence of the in-plane deviation. As described above, precision of the gradation correction is improved when the number of reference patches is increased.

However, in the visual gradation correction, because a user visually executes a comparison operation of a reference patch and a criterial patch, a load of the user is increased if the number of comparison operations of the reference patch and the criterial patch is increased.

SUMMARY OF THE INVENTION

According to an aspect of the present disclosure, an image forming apparatus includes a forming unit configured to form a set of reference patches corresponding to a plurality of different density regions through an image forming unit while making the reference patches correspond to a plurality of screen types, an input unit configured to input a comparison result between each of the reference patches and criterial patches having densities as criteria at each of the plurality of screen types, and a generation unit configured to generate information for correcting a density of an image formed by the image forming unit at each of the plurality of screen types by using the comparison result input by the input unit, wherein the information generated by the generation unit for correcting an image in a highest density region from among the plurality of different density regions is commonly generated according to the comparison result input with respect to each of the reference patches formed at each of the plurality of screen types.

According to the present disclosure, it is possible to improve correction precision of visual gradation correction without increasing a load of a user.

Further features of the present disclosure will become apparent from the following description of exemplary embodiments with reference to the attached drawings.

BRIEF DESCRIPTION OF THE DRAWINGS

FIGS. 8A, 8B, 8C, 8D, and 8E are a graph and tables illustrating gradation correction processing.

DESCRIPTION OF THE EMBODIMENTS

Hereinafter, an exemplary embodiment of the present disclosure will be described with reference to the appended drawings.

Figure 1:
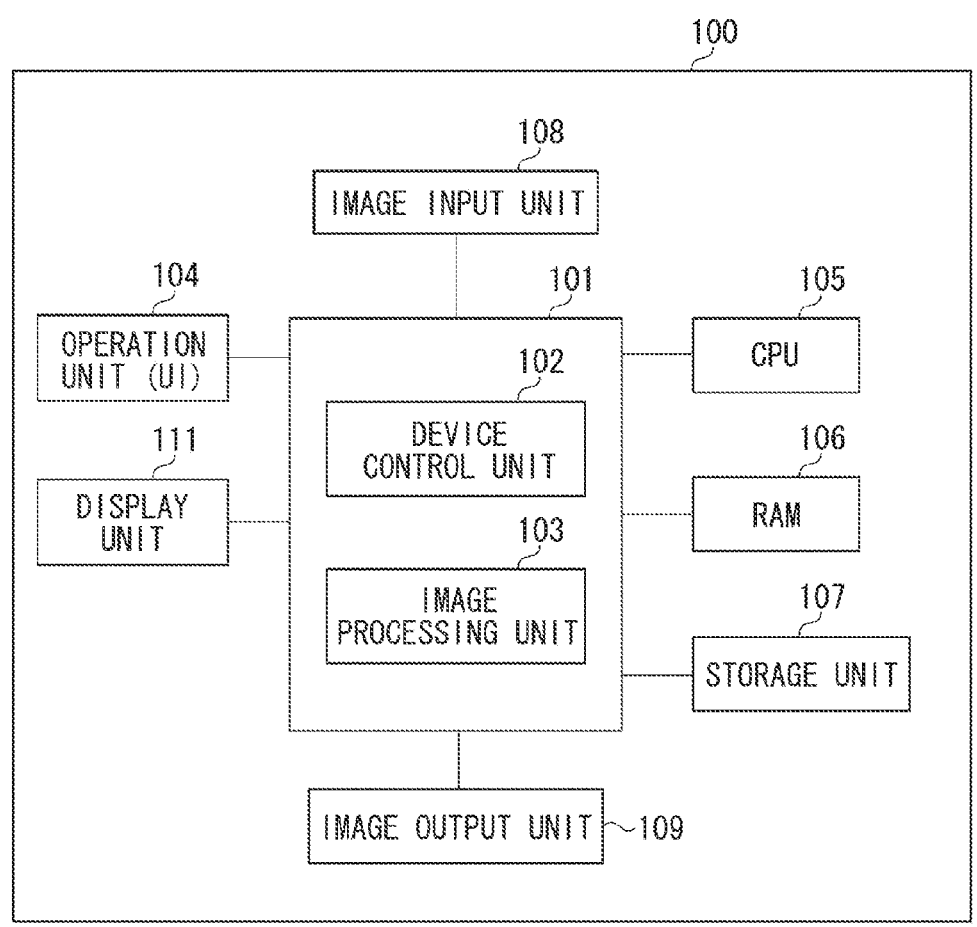
FIG. 1 is a block diagram illustrating a configuration of an apparatus.

FIG. 1 is a block diagram illustrating a configuration of an apparatus for realizing a present exemplary embodiment. An image forming apparatus 100 includes respective units for inputting, outputting, and processing an image. As used herein, the term "unit" generally refers to any combination of software, firmware, hardware, or other component, such as circuitry, that is used to effectuate a purpose.

A control unit 101 serves as a control unit of the image forming apparatus 100, and includes a device control unit 102 for controlling the image forming apparatus 100 and an image processing unit 103 for optimizing image data.

The control unit 101 uses a central processing unit (CPU) 105 and a random access memory (RAM) 106 to acquire an image from an image input unit 108, processes to store image data in a storage unit 107, and forms to output an image onto a sheet or a recording device such as a monitor thorough an image output unit 109.

Various settings are notified to the control unit 101 through a user interface (UI) 104 serving as an operation unit such as a mouse or a keyboard and a display unit 111 such as a touch panel having a preview function, and the image processing unit 103 processes the image data based on the settings notified thereto.

Alternatively, a value that is set through the UI 104 is stored in the storage unit 107 through the device control unit 102, so that the image processing unit 103 reads the stored setting value in order to process the image data.

The storage unit 107 stores parameters for controlling the image forming apparatus 100, an application program for realizing the present exemplary embodiment, and an operating system (OS). The above-described units are the constituent elements minimally necessary for the image forming apparatus 100, and a network interface such as a router or a firewall and an information processing apparatus such as a personal computer (PC) connected to the image forming apparatus 100 may be added thereto as necessary.

Further, any desired configuration can be added thereto when the entire image forming apparatus 100 is taken into consideration.

A visual gradation correction method employed in the present exemplary embodiment will be described with reference to FIGS. 8A and 8B.

FIG. 8A is a graph illustrating a gradation characteristic in which a horizontal axis represents an input signal input to a gradation correction processing unit whereas a vertical axis represents an output density. In FIG. 8A, a gradation characteristic as a target of the image forming apparatus 100 (hereinafter, referred to as "target gradation") is expressed as a target gradation 811. In this case, a value of the output density is adjusted to "1" when a value of the input signal is "1", and a value of the output density is adjusted to "2" when a value of the input signal is "2". The input signal value may be associated with the output density value through a conversion table as illustrated in FIG. 8B, or the output density value may be calculated from the input signal value through an equation stored therein. Herein, a method using the conversion table will be described.

As illustrated in FIG. 8B, a target value (i.e., target gradation value) set with respect to the input signal value is previously input to a column "TARGET". Then, when gradation correction is executed, a value is input to a column "CORRECTION".

When the image forming apparatus 100 is operated in an ideal state, the actual gradation characteristic conforms to the target gradation 811. However, because the state of the image forming apparatus 100 is changed according to the environmental change or the use condition, the actual gradation characteristic thereof fluctuates constantly. For example, under a certain situation, the output density may be "2" (density becomes higher) when the input signal is "1", or the output density may be "4" (density becomes lower) when the input signal is "5".

In the above situation, as illustrated in a first row 821 of the conversion table in FIG. 8B, because the actual output density is "2" when a value of "INPUT" is "1", a value "−1" is set to the conversion table as a value of "CORRECTION" with respect to the input value. With this correction value, the output density value can be corrected and conform to the target gradation value. Further, as illustrated in a fifth row 825 of the conversion table in FIG. 8B, when a value of "INPUT" is "5", "+1" is set to the conversion table as a value of "CORRECTION" with respect to the output value. With this correction value, the correction similar to the above-described correction can be executed.

In practice, the target gradation 811 of the image forming apparatus 100 is set at each color or screen processing having a different gradation characteristic, and thus the gradation correction is executed respectively.

A correction value used as information for making a correction is acquired from a comparison result between an image density (an output density) that is actually output with respect to one input signal and a criterion density (a target density for the target gradation corresponding to the input signal value). The user may acquire a confirmation chart in which an image (reference patch) is printed on a printing medium from the image forming apparatus 100, measure a density (target density) of the output reference patch by using a measurement device, and compare the measurement result with the target density. However, as described above, since the above-described method uses an image reading device such as a measurement device or a scanner, an image forming apparatus such as a printer which does not have a reading device, cannot realize the method.

On the contrary, the visual gradation correction in which a user visually compares the output density with the target density corresponding to that output density can provides a user with a low-priced simple correction method in an image forming apparatus (multifunction peripheral) having a scanner.

Figure 2:
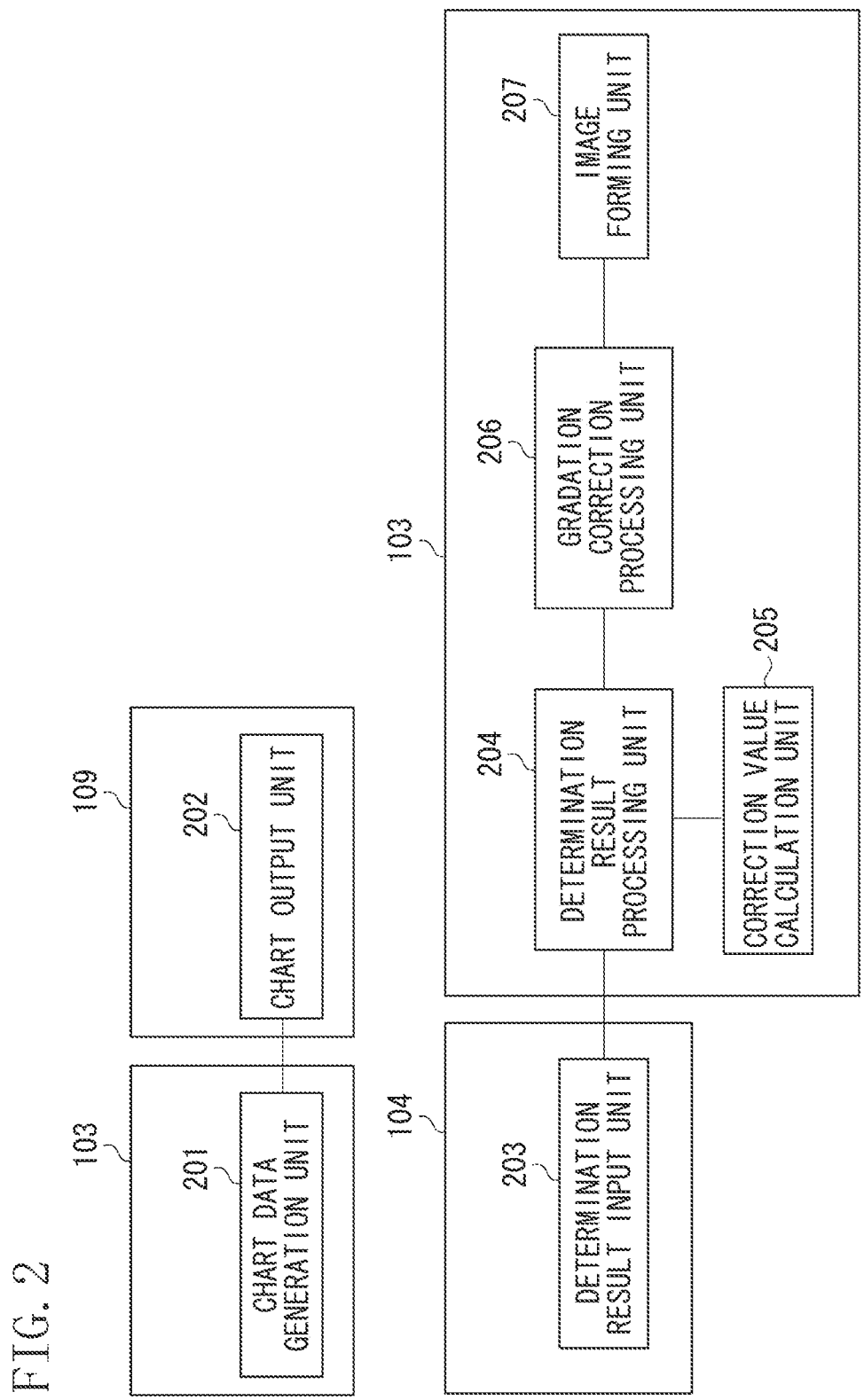
FIG. 2 is a block diagram illustrating a configuration of a module.

FIG. 2 is a block diagram illustrating a configuration of a module necessary for realizing the gradation correction processing according to the present exemplary embodiment. A chart data generation unit 201 included in the image processing unit 103 generates data (chart data) for printing a confirmation chart on which the reference patches are printed. Then, a chart output unit 202 included in the image output unit 109 uses the generated data to print the confirmation chart. At this time, according to a method of the gradation correction processing, it is possible to similarly execute generation of data for printing a sample chart on which criterial patches are printed and for printing of the sample chart.

The confirmation chart is printed based on an instruction from the user who executes the gradation correction processing.

On the other hand, the sample chart is printed under the condition where the image forming apparatus 100 is guaranteed to output an image with an appropriate output characteristic at the time of shipment. Alternatively, the sample chart may be printed under the condition determined by the user that the image forming apparatus 100 can output the image with an ideal output characteristic.

In other words, the sample chart may be printed under the condition where the image forming apparatus 100 is guaranteed to output an image with an appropriate output characteristic prior to execution of the gradation correction processing.

By using the printed charts, the user compares each of the reference patches printed on the confirmation chart with the criterial patches printed on the sample chart, and determines deviation from the density indicated by the criterial patches. The user inputs a result of the above determination through a determination result input unit 203 of the UI 104. A determination result processing unit 204 included in the image processing unit 103 acquires the input result, and a correction value calculation unit 205 acquires a correction value. After a gradation correction processing unit 206 corrects the gradation characteristic, an image forming unit 207 reproduces the gradation through the screen processing.

Theoretically, in the gradation correction processing, the gradation may desirably be corrected by using a determination result acquired from a comparison between the target gradation and actual density deviation with respect to all of the values that the input signal value can take, when the correction precision is taken into consideration. However, for example, since the image forming apparatus such as a color printer processes the input color information in 8-bit (256-gradation), an input signal of the gradation correction processing can take the enormous number of values.

Therefore, a value serving as a target (signal value or density value) at which a difference is determined from the actual comparison between two patches is set previously. Then, with respect to a value other than the value previously set as a target, analogical (interpolation) processing is executed based on the actual determination value. With this configuration, it is possible to improve the processing efficiency. For example, in FIG. 8A, determination target values are set to two points, i.e., a point 813 (input signal value 1) and a point 817 (input signal value 5). Then, the correction values are calculated in a pseudo manner with respect to the other points 814 (input signal 2) to 816 (input signal 4) by executing linear interpolation by making the points 813 and 817 as end points. These correction values correspond to estimated values illustrated in a column "CORRECTION" of respective rows 822 to 824 in FIG. 8B.

The deviation between the target gradation and the actual density is practically determined at only two points, i.e., the output densities with respect to the input signal values 1 and 5. At this time, it is estimated that the gradation characteristic has a characteristic indicated by an actual gradation characteristic 812 illustrated in the graph in FIG. 8A.

The correction precision is improved if the number of values set as the actual determination targets is increased. However, time taken for the correction processing is increased.

Further, a load of the user is increased when the user executes visual gradation correction in which densities of the reference patches and the criterial patches are compared visually.

Accordingly, in a case where the visual gradation correction is to be executed, the number of determinations (comparisons) has to be reduced to a minimum while the actual work load is taken into consideration.

In a case where the measurement device is employed, it is possible to make a determination with high precision because the output density value can be measured practically. On the other hand, in a case where the difference is determined by a visual comparison between the two patches, a determination is made based on a relative comparison. Therefore, a comparison error or a determination error is likely to occur because the determination is made by the human eyes.

In particular, it is known that a cumulative color difference of a single color such as cyan, magenta, yellow, or black (CMYK) at a time when a density thereof is increased to a certain extent is saturated as the density thereof transitions to a higher density. Therefore, it is difficult for the human eyes to determine a density difference of the high density region.

In order to improve the correction precision of the visual gradation correction without increasing the number of comparisons or determinations, a characteristic of an image formed by the following screen processing is used.

As described above, in the screen processing that creates color gradations, the gradation characteristics vary according to different configurations such as the number or the density of color dots (color lines). Therefore, in a case where a plurality of pieces of screen processing is to be executed (i.e., a plurality of image forming methods is employed), reference patches including respective screens have to be compared with criterial patches in order to determine the deviation. In particular, because a screen structure of the color dots (color lines) distinctly exists in a range between the low density region and the medium density region, the gradation characteristics thereof are clearly different from each other. However, because the color dots (color lines) are congested in the high density region, existence of the screen structure becomes ambiguous, and thus a difference in the gradation characteristic caused by a difference in the screen structure does not occur. Therefore, in a case where the reference patches having a plurality of different gradation values are printed on the confirmation chart while the number of gradations is two or more, the reference patches of the highest density region are formed in a density (high density) of a certain extent in which a gradation difference caused by a difference in the screen types does not occur.

Then, a deviation determination result acquired from a comparison between the reference patch of the high density region and the criterial patch is commonly applied to the reference patches of the high density region separately formed of the respective screens.

With this configuration, in a case where a determination is to be executed by using the reference patches according to a plurality of screen types, a reference patch of the same density in which the gradation difference does not occur is determined for a plurality of times only for the high density region. Accordingly, a plurality of determination results with respect to the reference patch of one type can be acquired.

Because a correction value is acquired from a plurality of determination results, it is possible to acquire a correction result with higher precision.

In the present exemplary embodiment, description will be given to a configuration in which two points such as the input signal value 1 (low density region) and the input signal value 4 (high density region) are specified as determination target values with respect to the input signal values in seven levels of 0 to 6, while the image forming apparatus provides two types of screen processing such as "low line number screen processing" and "high line number screen processing".

Figure 3:
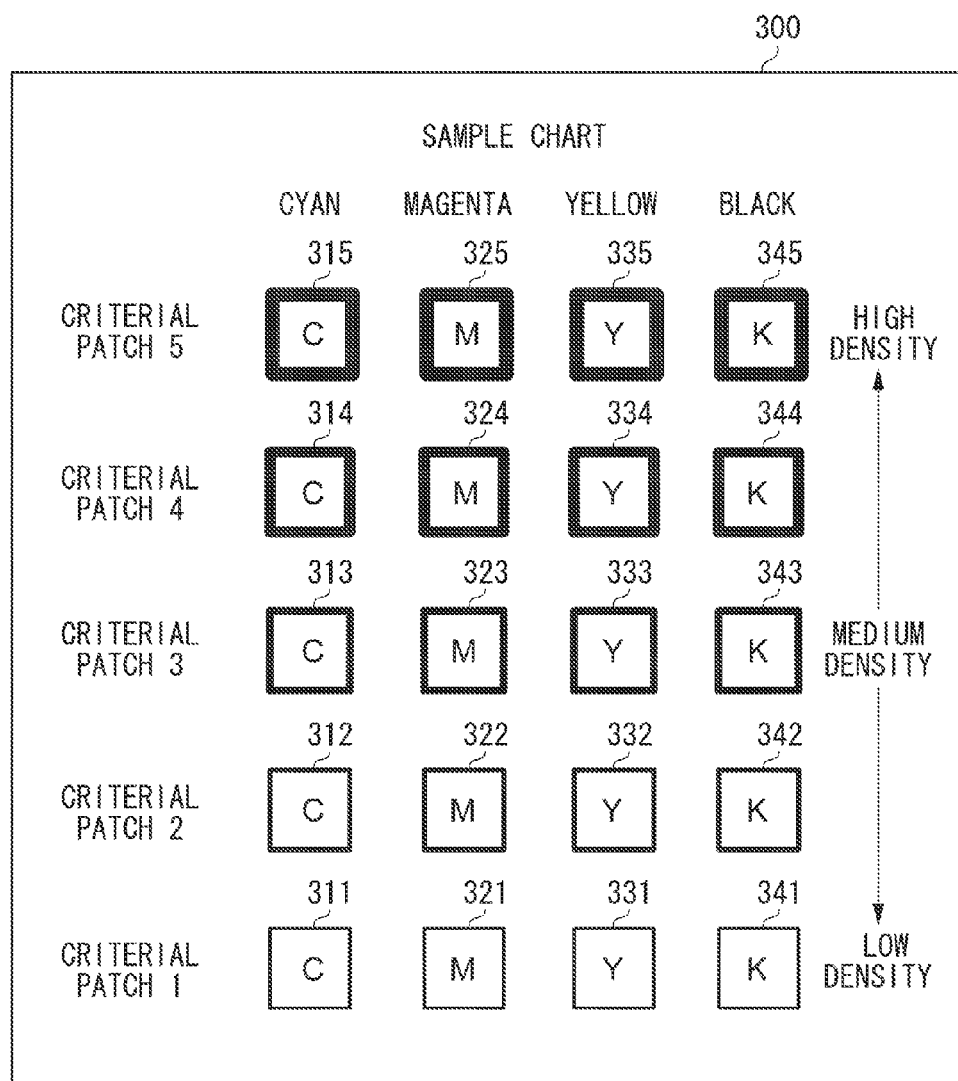
FIG. 3 is a diagram illustrating an example of a sample chart.

FIG. 3 is a diagram illustrating a sample chart 300 described in the present exemplary embodiment. A predetermined standard sheet may desirably be used as a sheet to which the sample chart 300 is output.

Criterial patches 311 to 345 respectively having certified density values in five gradations from a low density to a high density in respective colors of CMYK are printed on the sample chart 300.

A density corresponding to each of criterial patch numbers 1 to 5 is determined previously, and the density becomes darker in a greater number.

For example, the criterial patch number 5 corresponds to a density value of 1.4, and each of the adjacent criterial patches is output in an equal color difference.

Figure 4:
FIG. 4 is a diagram illustrating a confirmation chart according to a first exemplary embodiment.

Similarly, FIG. 4 is a diagram illustrating a confirmation chart 400. The confirmation chart 400 may desirably be output to a sheet of the same type as the sheet to which the sample chart 300 is output.

Reference patches 411 to 444 in two gradations such as "low density" and "high density" in respective colors of CMYK formed of two types of screens, that is, a "low line number screen" and a "high line number screen" are arranged in the confirmation chart 400 generated and output by the image forming apparatus 100 serving as a correction target.

Output densities of the reference patches 411 to 444 are determined previously, and each of the reference patches is provided with a target density number.

Every reference patch is associated with a criterial patch number that indicates a density to which the density of the reference patch conforms when the image forming apparatus 100 is operated in the ideal state.

For example, when the image forming apparatus 100 is operated in the ideal state, the reference patch 414 is output in a density conforming to a density of the criterial patch 315 categorized in a criterial patch number 5, whereas the reference patch 424 is output in a density conforming to a density of the criterial patch 311 categorized in a criterial patch number 1.

Therefore, the target density number with respect to the reference patch 414 is "5", whereas the target density number with respect to the reference patch 311 is "1".

Figure 9:
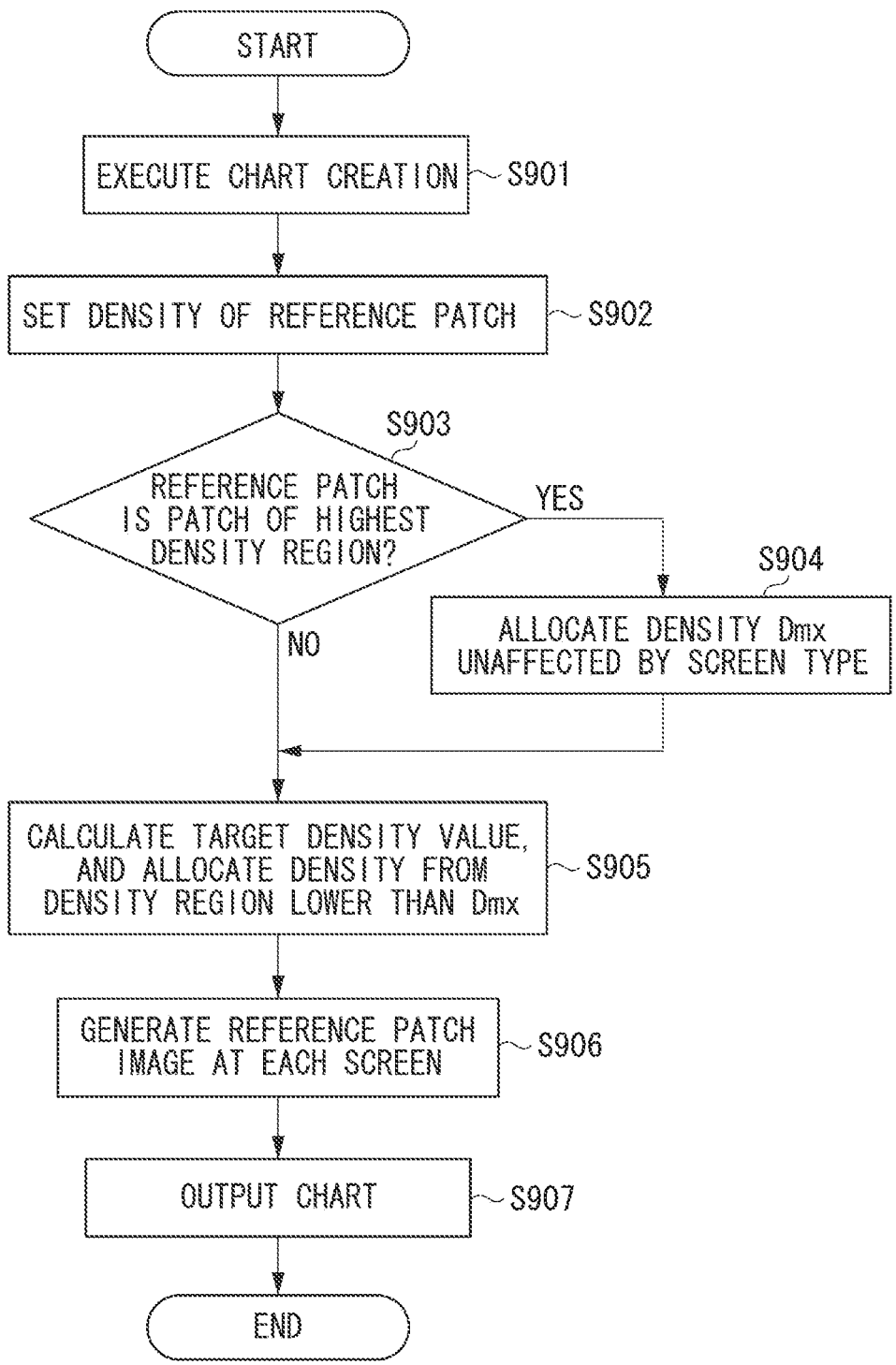
FIG. 9 is a flowchart illustrating chart generation processing according to the first exemplary embodiment.

A creation method of the confirmation chart 400 will be described below, in detail, with reference to FIG. 9.

When the visual gradation correction is to be executed, for example, the reference patch 414 (formed of the low line number screen in the high density in cyan) as a determination target printed on the confirmation chart 400 is visually compared with each of the criterial patches 311 to 315 in cyan printed on the sample chart 300, and a criterial patch that is printed in a density determined to be the closest to that of the reference patch 414 is selected.

When the image forming apparatus 100 is operated in the ideal state, it is determined that the density of the reference patch conforms to the density of the criterial patch categorized in the target density number. However, in a case where an image having a density lower than the target gradation characteristic is output because of change in the state of the image forming apparatus 100, it may be determined that the density of the reference patch 414 conforms to the density of the criterial patch 314 categorized in the criterial patch number 4 or criterial patch 313 categorized in the criterial patch number 3 that indicates a density lower than the densities indicated by the target density number.

Figure 5:
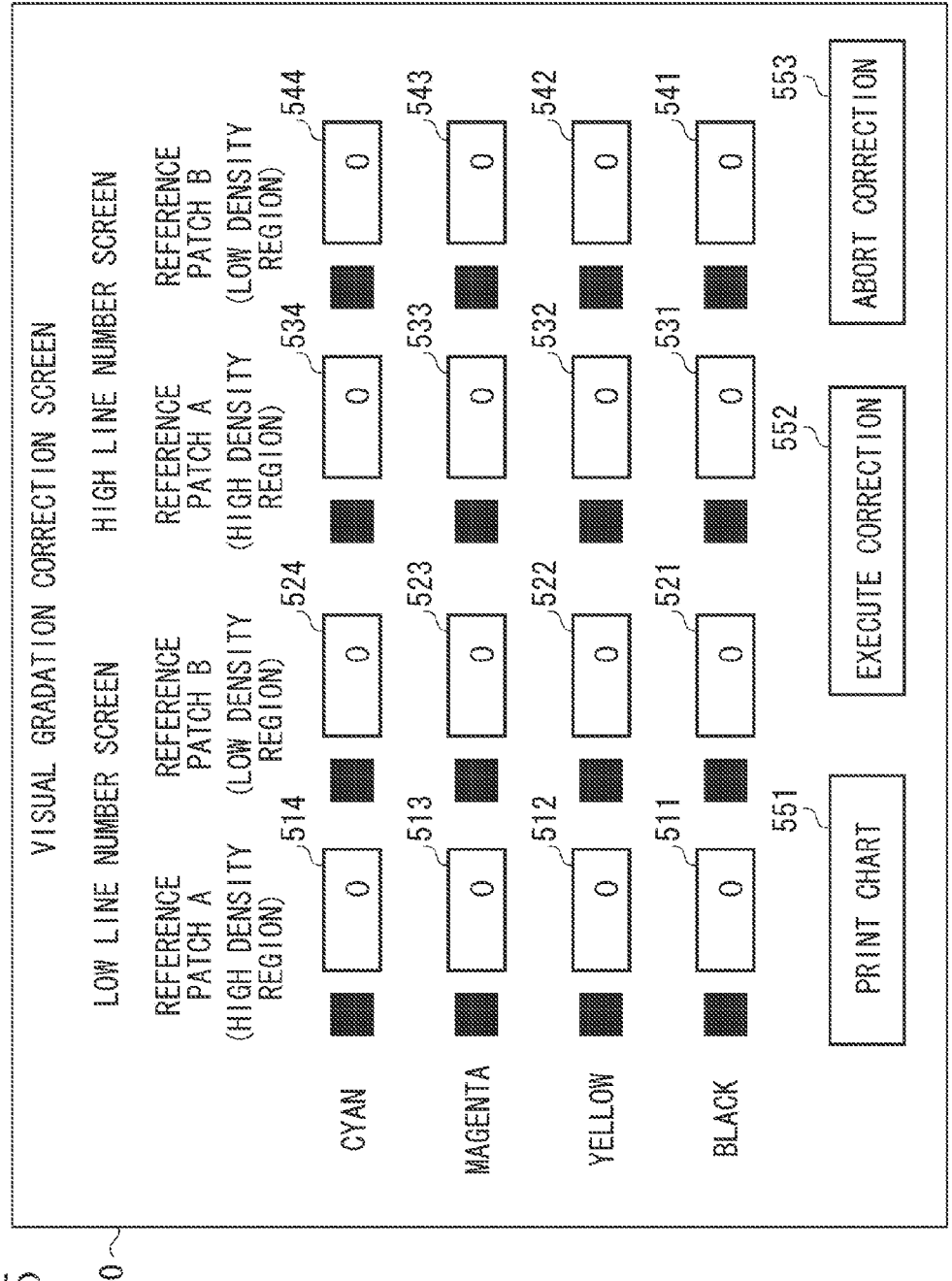
FIG. 5 is a diagram illustrating a determination result input screen displayed on a user interface (UI) according to the first exemplary embodiment.

FIG. 5 is a diagram illustrating a screen (input screen) displayed on the UI 104 in order to activate the visual gradation correction.

When a PRINT CHART button 551 provided on the lower side of an input screen 500 is pressed, the confirmation chart 400 is printed at the current state of the image forming apparatus 100. Thereafter, the user compares the reference patch with the criterial patch to determine deviation. As a result, the criterial patch number (herein, any one of 1 to 5) indicating a density closest to that of the reference patch as a target of the comparison and the determination is input to a corresponding input portion provided on the input screen 500.

As illustrated in FIG. 5, in the present exemplary embodiment, the input screen 500 is configured of input portions 511 to 544 arranged in a same arrangement order as that of the reference patches 411 to 444 printed on the confirmation chart 400. In other words, a determination result of the reference patch 444 of the confirmation chart 400 is input to the input portion 544 arranged in a same position of the input screen 500. With the above-described configuration, when a comparison and a determination of the reference patch and the criterial patch is to be executed, it is possible to reduce a troublesome operation in which the user has to look for an input position on the input screen whenever the result is input thereto.

When the arrangement of the reference patches 411 to 444 printed on the confirmation chart 400 is changed, the arrangement of the input portions 511 to 544 displayed on the input screen 500 in FIG. 5 is changed accordingly. Arrangement information of the reference patches 411 to 444 and arrangement information of the input portions 511 to 544 may be previously stored in association with each other.

The correction processing starts when an EXECUTE CORRECTION button 552 is pressed after all of the reference patches are compared with the criterial patches and results of the deviation determination are input thereto. In a case where an ABORT CORRECTION button 553 is pressed, the image forming apparatus 100 ends the processing without execution.

A flow of confirmation chart creation processing according to the present exemplary embodiment will be described with reference to FIG. 9.

A control program for executing processing in respective steps of the flowchart is loaded on the RAM 106, and the CPU 105 executes the control program in order to execute the processing illustrated in the flowchart.

When the PRINT CHART button 551 on the input screen 500 is pressed, in step S901, the chart data generation unit 201 starts chart data generation processing for creating a confirmation chart. Then, in step S902, density setting of the reference patch is executed at each screen provided by the image forming apparatus 100. In step S903, the CPU 105 determines whether a target of the density setting is a reference patch of the highest density region from among the reference patches included in the confirmation chart 400. If the target is determined to be the reference patch of the highest density region (YES in step S903), the processing proceeds to step S904. Then, in step S904, the density Dmx unaffected by the screen type (in FIG. 8A, the output density "5") is allocated as a density for printing the reference patch as the setting target.

On the other hand, if the target is determined not to be the reference patch of the highest density region (NO in step S903), the processing proceeds to step S905. In step S905, a density lower than the density Dmx is appropriately allocated as a density for printing the reference patch as the target according to the number of gradations of the reference patch to be generated.

For example, in a case where the number of gradations is 2 when a plurality of reference patches having different gradation values is printed on the confirmation chart 400, the reference patches A 411 to 414 and 431 to 434 of the high density region from among the reference patches 411 to 444 included in the confirmation chart 400 in FIG. 4 are printed in a density corresponding to "Dmx=5". Then, the reference patches B 421 to 424 and 441 to 444 of the low density region are printed in a density corresponding to the density "1" which is the density lower than the density "5".

The density of reference patches of a density region other than the high density region can be optionally determined while ease of the comparison with the criterial patches is taken into consideration. Further, the density of the reference patches of the density region other than the high density region may be different at each color.

Figure 10:
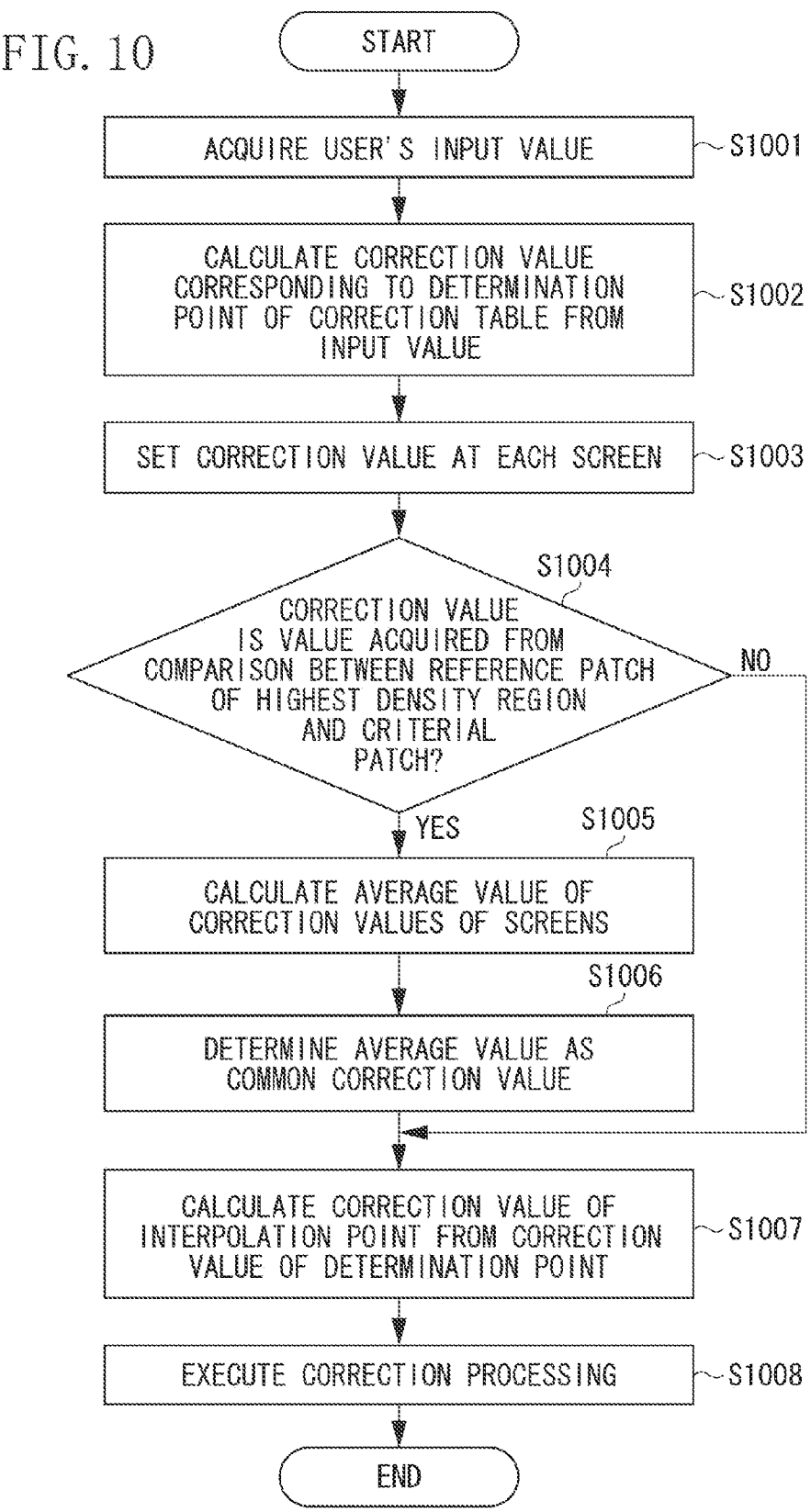
FIG. 10 is a flowchart illustrating correction processing according to the first exemplary embodiment.

In step S906, a reference patch image is generated at each screen processing in the set density, and confirmation chart image data is transmitted to the chart output unit 202. In step S907, the chart output unit 202 outputs the confirmation chart 400 and ends the processing. Subsequently, a flow of gradation correction processing according to the present exemplary embodiment will be described with reference to FIG. 10.

A control program for executing processing in respective steps of the flowchart is loaded on the RAM 106, and the CPU 105 executes the control program in order to execute the processing illustrated in the flowchart.

When the EXECUTE CORRECTION button 552 of the input screen 500 is pressed, the determination result processing unit 204 and the correction value calculation unit 205 start the gradation correction processing.

In step S1001, a value input through the determination result input unit 203 of the UI 104 is acquired.

In step S1002, a difference between a density corresponding to a value input to the UI 104 (i.e., density corresponding to a criterial patch number determined to be the same as that of the reference patch by the user) and a density corresponding to the target density number with respect to the reference patch is acquired. Then, a density of an image currently output from the image forming apparatus 100 is determined from the acquired difference. Thereafter, a correction value is acquired from a result of the determination.

For example, in a case where the input signal value 1 (low density) in FIG. 8A is specified as a determination point for executing a comparison and a determination of the reference patch and the criterial patch, the density thereof conforms to the target density if a value input to the UI 104 is "1", and thus the correction value is set to "0". On the other hand, in a case where a value input to the UI 104 is "2", it is determined that the density greater than the target density by a value "+1" (i.e., density darker than the target density) is output from the image forming apparatus 100. Therefore, the correction value is set to "−1". As described above, the acquired result, a value "−1", is set to a column "CORRECTION" of the first row 821 corresponding to the input signal value 1 of the conversion table illustrated in FIG. 8B.

In step S1003, the above-described processing is executed at each of the screens in respective colors, so that correction values for respective determination points are set thereto, and the correction values are set to the column "CORRECTION" of the conversion table illustrated in FIG. 8B.

After the correction values are acquired with respect to all of the determination points, the processing proceeds to step S1004. Then, in step S1004, the CPU 105 determines whether the acquired correction value is a value acquired from a comparison between the reference patch of the highest density region and the criterial patch.

If it is determined that the acquired correction value is a value acquired from a comparison and a determination of the densities of the reference patch of the highest density region and the criterial patch (YES in step S1004), the processing proceeds to step S1005. Then, in step S1005, an average value is calculated from the correction values acquired from the screens. Then, the processing proceeds to step S1006.

Then, in step S1006, the average value calculated in step S1005 is overwritten and set as a correction value common to the screens.

Although the average value has been acquired, the average value may not have to be acquired if all of the correction values acquired from a comparison and a determination of the reference patches of the high density region and the criterial patches are the same.

Further, a representative value may be acquired from a plurality of correction values instead of acquiring the average value.

On the other hand, in step S1004, if it is determined that the acquired correction value is not a value acquired from a comparison and a determination of the reference patch of the highest density region and the criterial patch (NO in step S1004), the processing proceeds to step S1007.

In step S1007, a correction value of an interpolation point corresponding to the input signal value other than the determination point is acquired. In FIG. 8A, linear interpolation is executed on a portion between two determination points 813 and 817 corresponding to the input signal values 1 and 5. Specifically, correction values of respective interpolation points 814, 815, and 816 are respectively acquired as −0.5, 0, and +0.5. These correction values are set to the column "CORRECTION" of the second to the fourth rows 822 to 824 of the conversion table.

After the conversion table is completed through the above-described processing, in step S1008, the gradation correction processing unit 206 sets the conversion table and ends the processing. In a case where an output image is to be actually processed, the gradation correction processing unit 206 uses the conversion table to execute the gradation correction, and the image forming unit 207 generates the output image.

Through the above-described configuration, with respect to a range between the medium density region and the low density region likely to be affected by the screen, the reference patch is compared with the criterial patch at each screen type, so that the correction can be executed by using each determination result.

On the other hand, with respect to the high density region that is less likely to be affected by the screen but likely to have a visual determination error, a plurality of determination results can be acquired with respect to the reference patch of the same density.

Then, an average of the determination results is calculated from the plurality of the determination results in order to acquire information necessary for making a correction. Therefore, it is possible to acquire the information necessary for making a correction with higher precision without increasing the number of determinations.

Further, a determination result of the reference patch of the high density region and the criterial patch input to the input screen 500 may be regarded as a determination result of the reference patch formed of an optional screen, so that the input value is shared as a comparison result of the reference patch formed of another screen.

In this case, for example, when a result is input to the input portion 514, that result is also input to the input portion 534 automatically. With this configuration, the number of determinations can be decreased with respect to the high density region.

Hereinafter, a second exemplary embodiment will be described with reference to the appended drawings.

In the image forming apparatus 100 of a certain printing system, in-plane deviation in which the output density slightly varies in one printed sheet depending on a position or a peripheral image may occur. In order to absorb a determination error caused by the in-plane deviation, it is effective to use a method in which a plurality of reference patches of the same type is arranged in different positions of the confirmation chart, and a correction value is determined based on a plurality of determination results. However, using the above method causes the number of determinations to be increased.

In the present exemplary embodiment, with respect to the input signal values in seven levels of 0 to 6, two points such as an input signal value 1 (low density region) and an input signal value 4 (high density region) are specified as determination targets. Further, the image forming apparatus 100 provides three kinds of screen processing, i.e., "low line number screen processing", "high line number screen processing", and "error diffusion screen processing".

In this case, of the reference patches formed of the above-described screens, the reference patches of the high density region are regarded as the same patch. With this configuration, an example where the gradation correction, in which the in-plane deviation is taken into consideration, is executed without increasing the number of comparisons or determinations of the reference patch and the criterial patch executed by a user will be described below.

Figure 6:
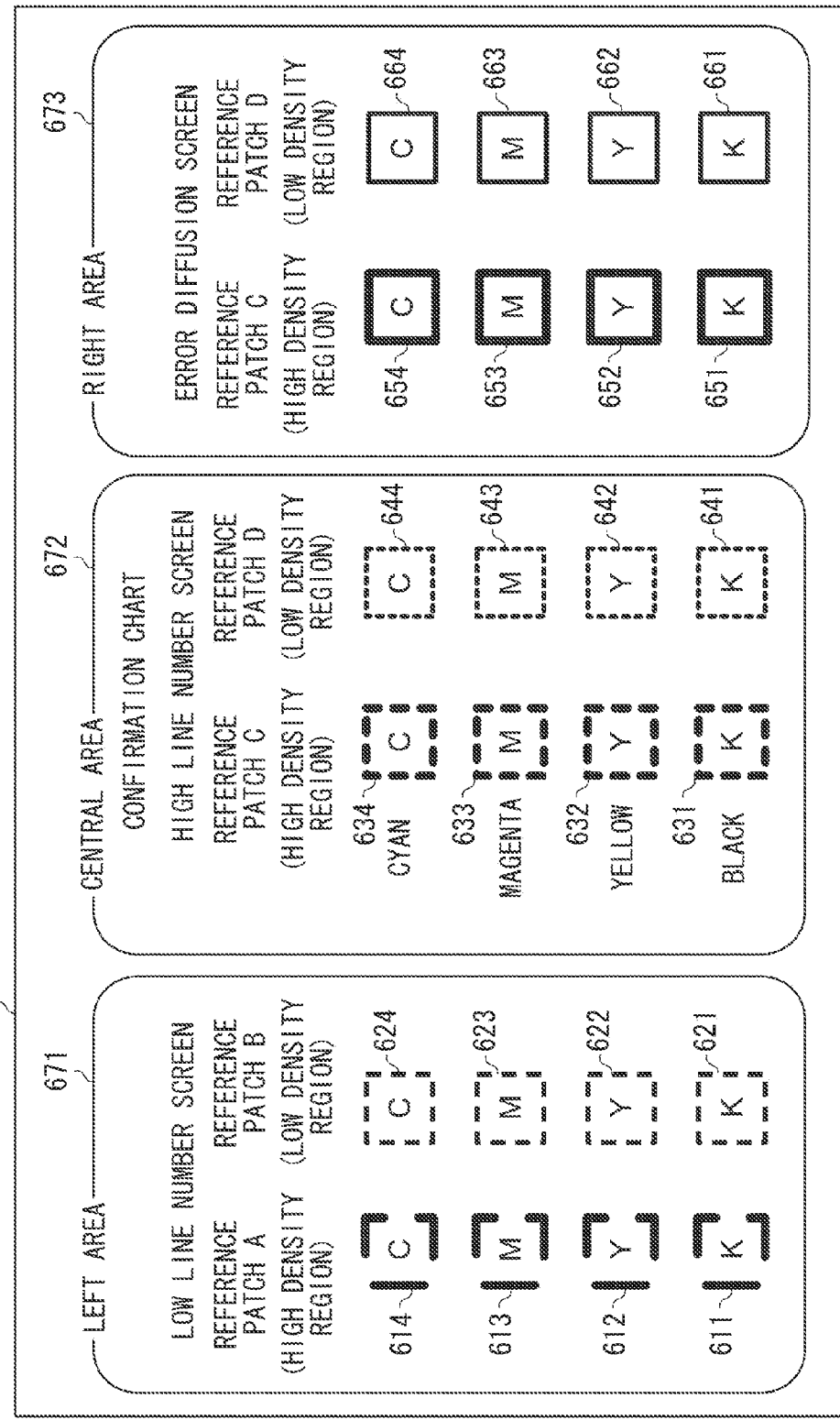
FIG. 6 is a diagram illustrating a confirmation chart according to a second exemplary embodiment.

FIG. 6 is a diagram illustrating a confirmation chart according to the present exemplary embodiment.

A confirmation chart 600 is generated and output by the image forming apparatus 100 serving as a correction target by using three types of screens, a "low line number screen", a "high line number screen", and an "error diffusion screen". Then, reference patches 611 to 664 are arranged in the confirmation chart 600. These reference patches 611 to 664 are formed in respective colors of CMYK in the low density and the high density.

In addition, there may be a case where a density difference occurs in a central portion and end portions of a sheet in a laser scanning direction of the image forming apparatus 100. In order to consider the above density difference, at first, an arrangement of the reference patches is divided into a left end portion, a central portion, and a right end portion of the sheet. These portions are respectively referred to as a left area 671, a central area 672, and a right area 673. Then, the reference patches 611 to 664 formed of different screens are arranged in each of the areas 671 to 673. Herein, the reference patches formed of the low line number screen are arranged in the left area 671. Then, the reference patches formed of the high line number screen are arranged in the central area 672. Further, the reference patches formed of the error diffusion screen are arranged in the right area 673.

The reference patches formed of different types of screens can be optionally arranged in the areas 671 to 673. For example, in a case where a density is unstable in the both end portions of the sheet, the reference patches formed of the low line number screen having a stable density are preferably arranged in both end portions, whereas the reference patches formed of the high line number screen having an unstable density is arranged in the central portion. The reference patches arranged in the confirmation chart 600 in the above-described manner and the criterial patches arranged in the sample chart 300 illustrated in FIG. 3 are compared and determined, and the gradation correction is executed based on a compared and determined result.

Figure 11:
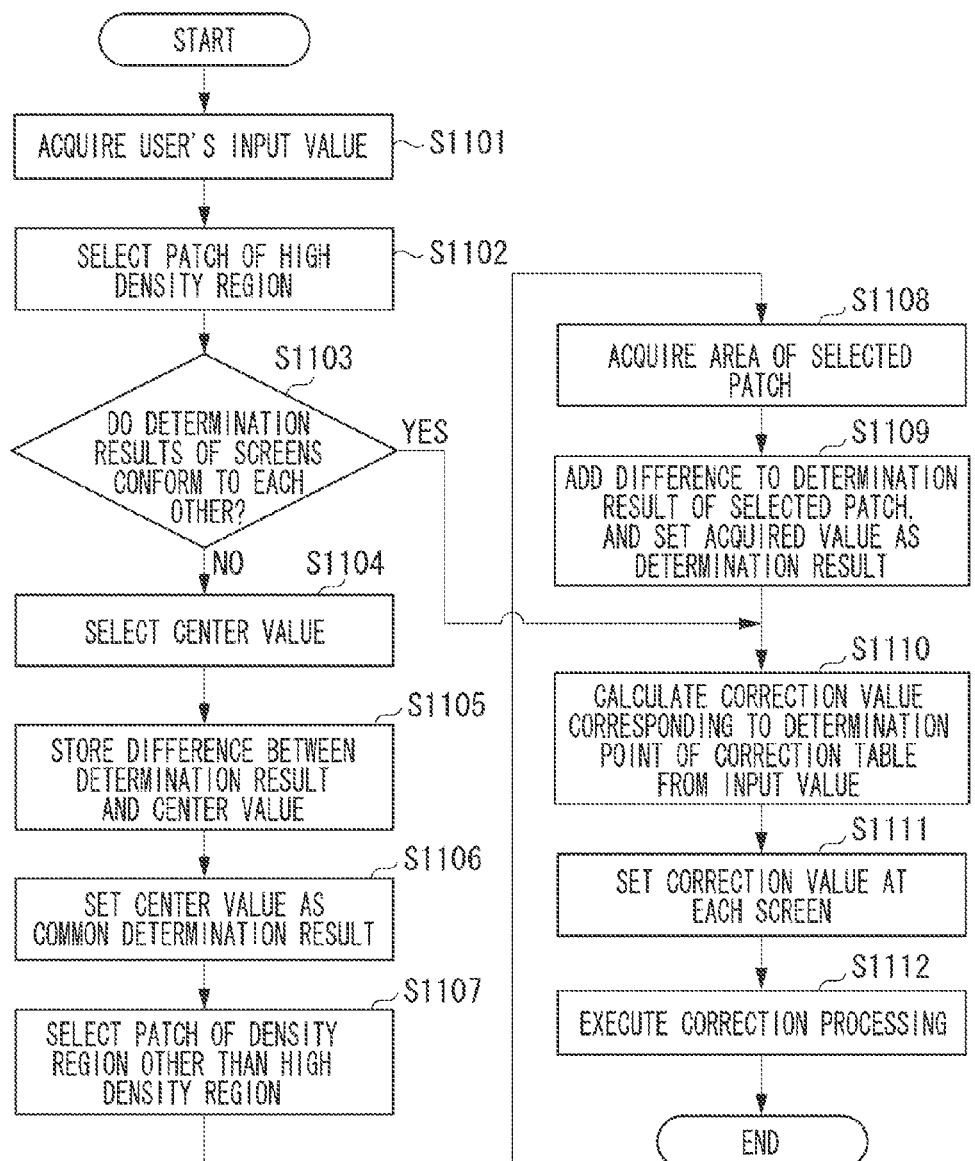
FIG. 11 is a flowchart illustrating correction processing according to the second exemplary embodiment.

A processing flow of the gradation correction according to the present exemplary embodiment, in which the in-plane deviation is taken into consideration, will be described with reference to FIG. 11.

A control program for executing processing in respective steps of the flowchart is loaded on the RAM 106, and the CPU 105 executes the control program in order to execute the processing illustrated in the flowchart.

When the EXECUTE CORRECTION button 552 of the input screen 500 is pressed, the determination result processing unit 204 and the correction value calculation unit 205 start the gradation correction processing.

In step S1101, a value input through the determination result input unit 203 of the UI 104 is acquired.

In step S1002, a difference between a density corresponding to the value input to the UI 104 (i.e., density corresponding to the criterial patch number determined to be the same as that of the reference patch by the user) and a density corresponding to the target density number with respect to the reference patch is acquired. Then, a density of an image currently output from the image forming apparatus 100 is determined from the acquired difference. Thereafter, a correction value is acquired from a result of the determination.

Hereinafter, for the purpose of description, attention is focused on the reference patches of cyan in FIG. 6, and a target gradation characteristic of an image formed in cyan is assumed to be the target gradation 811 illustrated in FIG. 8A.

Further, it is assumed that the reference patches A and B formed of respective screens are determined by the user as follows.

Left Area 671 (Left-End Portion of the Sheet)/Low Line Number Screen: The reference patch 614 of the high density region (in a density CL1) has a density the same as that of the criterial patch number 4 (criterial patch 314). The reference patch 624 of the low density region (in a density CL2) has a density the same as that of the criterial patch number 2 (criterial patch 312).

Central Area 672 (Central Portion of the Sheet)/High Line Number Screen: The reference patch 634 of the high density region (in a density CH1) has a density the same as that of the criterial patch number 4 (criterial patch 314). The reference patch 644 of the low density region (in a density CH2) has a density the same as that of the criterial patch number 1 (criterial patch 311).

Right Area 673 (Right-End Portion of the Sheet)/Error Diffusion Screen: The reference patch 654 of the high density region (in a density CE1) has a density the same as that of the criterial patch number 5 (criterial patch 315). The reference patch 664 of the low density region (in a density CE2) has a density the same as that of the criterial patch number 2 (criterial patch 312).

Herein, the gradation correction processing that is to be executed based on the above determination results will be described with reference to the conversion tables of the screens illustrated in FIGS. 8B to 8D and a difference table of the areas illustrated in FIG. 8E.

The conversion table in FIG. 8B is created based on a deviation determination result acquired from a comparison between the reference patch created by the low line number screen as an image forming method and the criterial patch.

The conversion table in FIG. 8C is created based on a deviation determination result acquired from a comparison between the reference patch created by the high line number screen as an image forming method and the criterial patch.

The conversion table in FIG. 8D is created based on a deviation determination result acquired from a comparison between the reference patch created by the error diffusion screen as an image forming method and the criterial patch.

In step S1103, the CPU 105 determines whether determination results of the reference patches of the high density region in cyan formed of different types of screens in respective areas conform to each other. If it is determined that the determination results of all of the reference patches conform to each other (YES in step S1103), the in-plane deviation is less likely to occur in the confirmation chart 600 on which the reference patches are formed. Therefore, it is not necessary to calculate a difference between the determination results because the in-plane deviation does not have to be taken into consideration. Therefore, the processing proceeds to step S1110, and the correction value is calculated.

If it is determined that the determination results of all of the reference patches do not conform to each other (NO in step S1103), the in-plane deviation is likely to occur, so that the processing proceeds to step S1104 because the in-plane deviation has to be taken into consideration. For example, in a case where the densities CL1 and CH1 have a value "4" whereas the density CE1 has a value "5" in the determination results, it is determined that the determination results do not conform to each other.

In order to acquire the determination result in which the in-plane deviation is taken into consideration, a value "4" that is the value acquired as the determination result the most is selected as a center value of the determination results. Then, the value "4" is stored in a column 851 of a row "CENTER VALUE" illustrated in FIG. 8E. Then, in step S1105, a difference between the determination result of each area and the center value is set to each of columns 852 to 854.

A value "0" is respectively set to the column 852 and the column 853 of the row "DIFFERENCE", because there is no difference between the center value and the determination results of the left area 671 and the central area 672. Further, because there is a difference between the center value and the determination result of the right area 673, a value "−1" is set to the column 854 of the row "DIFFERENCE".

From the above values, it is found that the right area 673 tends to have a density higher than the densities of the other areas.

In step S1106, all of the determination results of the reference patches of the high density region are set to the center value of "4". In this case, a value "5" as a determination result set to the column "DETERMINATION" of a row 845 of the conversion table of the right area 673 in FIG. 8D is replaced with the center value "4".

In step S1107, a reference patch of the density region other than the high density region (in this example, the low density region) is selected at each screen. In step S1108, an arrangement position of the reference patch 624 formed of the low line number screen is acquired. Then, in step S1109, a difference value of the corresponding area (herein, the left area 671) is acquired from the difference table in FIG. 8E. The acquired difference value is added to the determination result, so that the value of the determination result is replaced with a new value.

Because a difference value of the left area 671 is "0", a value set to the column "DETERMINATION" of the row 825 in FIG. 8B remains unchanged. A difference value is also "0" with respect to the central area 672 where the reference patch 644 formed of the low line number screen is arranged and positioned, a determination result thereof remains unchanged.

On the other hand, the right area 673 in which the reference patch 664 formed of the error diffusion screen is arranged has a difference value of "−1". Therefore, this difference value is added to the determination result. In other words, in step S1109, a value of the column "DETERMINATION" of a row 845 in FIG. 8D is changed from "5" to "4". The processing subsequent to the above-described processing is the same as the processing described in the first exemplary embodiment.

As described above, if there is a difference between a determination result of one area and the center value acquired from the determination results of deviation comparisons between the reference patches of the high density region and the criterial patches, the one area is determined to be the area having the in-plane deviation, so that the difference value is reflected on the determination result thereof. With this configuration, it becomes possible to acquire a determination result in which the in-plane deviation is taken into consideration.

In the above, description has been given to the confirmation chart in which density deviation in the main scanning direction is taken into consideration. However, depending on the image forming apparatus, there may be a case where the density deviation may occur in a sub-scanning direction. In such a case, it is possible to cope with the density deviation if the reference patches are arranged as illustrated in a confirmation chart 700 in FIG. 7. The confirmation chart 700 is generated and output by the image forming apparatus 100 serving as a correction target by using three types of screens, a "low line number screen", a "high line number screen", and an "error diffusion screen". Then, reference patches 711 to 764 are arranged in the confirmation chart 700. These reference patches 711 to 764 are formed in respective colors of CMYK in the low density and the high density. There may be a case where a density difference occurs in a sub-scanning direction of the image output from the image forming apparatus 100. Therefore, an arrangement of the reference patches is divided into an upper (leading end) portion, a central portion, and a lower (trailing end) portion of a sheet, and the portions are respectively referred to as an upper area 771, a central area 772, and a lower area 773. Then, the reference patches formed of different types of screens are arranged in each of the areas 771 to 773. Herein, reference patches formed of the low line number screen, the high line number screen, and the error diffusion screen are respectively arranged in the left portion, the central portion, and the right portion of each of the areas 771 to 773.

Figure 7:
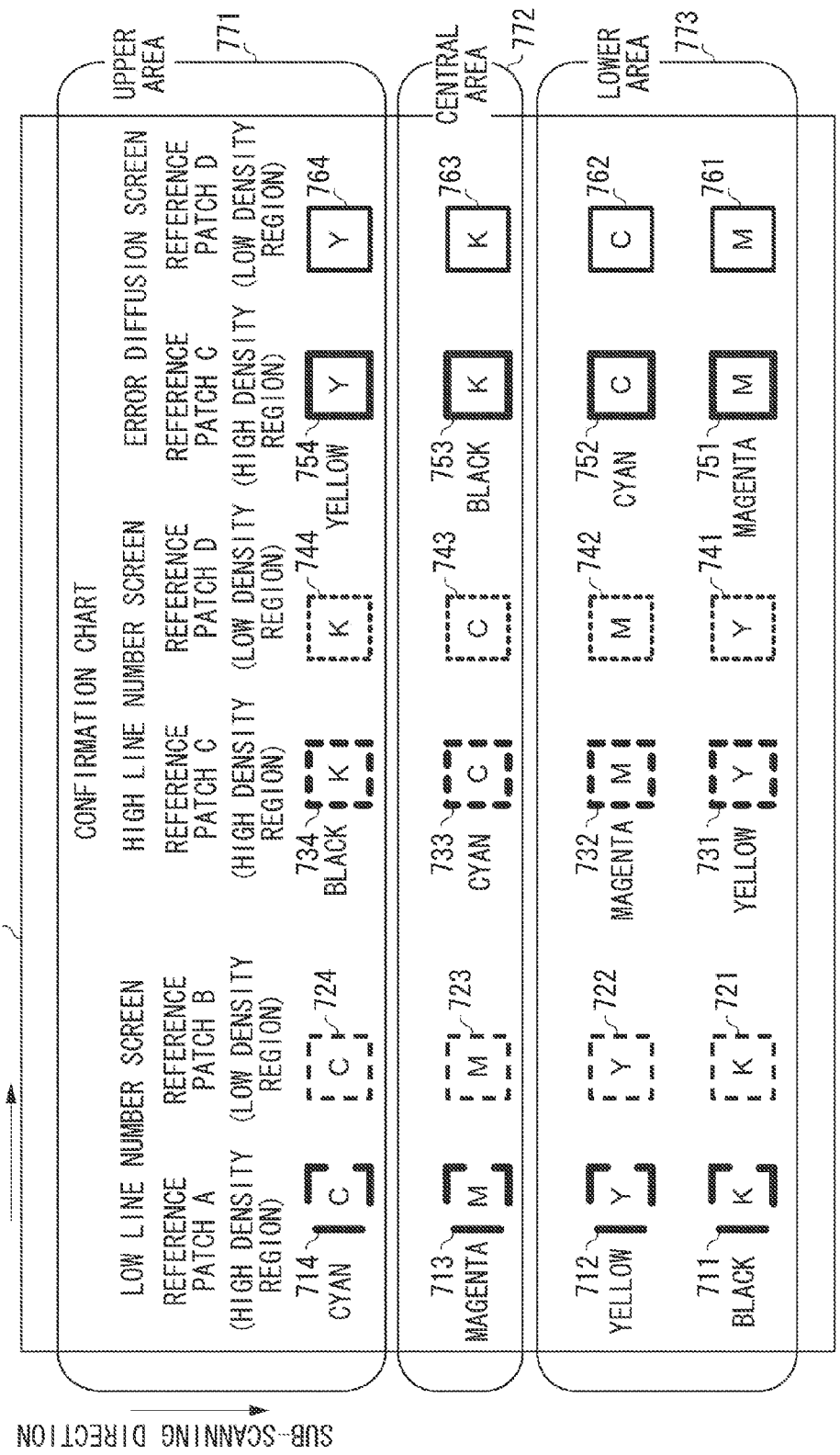
FIG. 7 is a diagram illustrating another confirmation chart according to the second exemplary embodiment.

As illustrated in the confirmation chart 700 in FIG. 7, the arrangement order of the reference patches of cyan, magenta, yellow, and black in the sub-scanning direction is different in each screen type.

With this arrangement, the center value can be acquired from the determination results of the reference patches of the high density region formed of the respective screens, and thus it is possible to determine presence or absence of the in-plane deviation in the upper area, the central area, and the lower area. Therefore, with respect to the area having the in-plane deviation, a difference value caused by the in-plane deviation is reflected on the determination result thereof, so that it is possible to acquire a determination result in which the in-plane deviation is taken into consideration.

Through the above-described configurations, in the high density region that is not affected by the type of screen used therefor, it is possible to generate a correction value by using a determination result in which the in-plane deviation is taken into consideration. Further, in a density region other than the high density region, because the influence of the in-plane deviation is estimated from a determination result of that density region and reflected on the determination result, it is possible to acquire a correction result with higher precision without increasing the number of determinations from the number thereof executed in the conventional technique.

Embodiments of the present disclosure can also be realized by a computer of a system or apparatus that reads out and executes computer executable instructions recorded on a storage medium (e.g., a non-transitory computer-readable storage medium or the like) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-254598, filed Dec. 16, 2014, which is hereby incorporated by reference herein in its entirety.

What is claimed is:

1. An image forming apparatus comprising:
    a forming unit configured to form a set of reference patches including a plurality of reference patches each corresponding to a different one of a plurality of density regions with a first screen type and form the set of reference patches with a second screen type different from the first screen type;
    an input unit configured to input a comparison result between each of the plurality of reference patches included in the set of reference patches formed with the first screen type and a corresponding one of a plurality of confirmation patches, and input a comparison result between each of the plurality of reference patches included in the set of reference patches formed with the second screen type and a corresponding one of the plurality of confirmation patches; and
    a generation unit configured to generate, based on information input by the input unit, correction information for correcting a density of an image to be formed by the forming unit with the first screen type and correction information for correcting a density of an image to be formed by the forming unit with the second screen type,
    wherein first correction information being information for correcting an image, formed with the first screen type, having a highest density among the plurality of density regions and second correction information being information for correcting an image, formed with the second screen type, having a highest density among the plurality of density regions are each a value generated by the generation unit based on a first comparison result between a reference patch, having the highest density among the plurality of density regions, included in the set of reference patches formed with the first screen type and a corresponding one of the plurality of confirmation patches, and a second comparison result between a reference patch, having the highest density among the plurality of density regions, included in the set of reference patches formed with the second screen type and a corresponding one of the plurality of confirmation patches, and the first correction information and the second correction information are the same.

2. The image forming apparatus according to claim 1, wherein the first correction information and the second correction information are obtained from an average of the first comparison result and the second comparison result.

3. The image forming apparatus according to claim 1, wherein the input unit includes an input screen for inputting a comparison result between each reference patch and each confirmation patch previously formed by the forming unit.

4. The image forming apparatus according to claim 1,
wherein the input unit includes an input screen for receiving a comparison result between each reference patch and each confirmation patch previously formed by the forming unit, and
wherein an arrangement of the reference patches formed by the forming unit and an arrangement of input portions for inputting comparison results arranged in the input screen are identical to each other.

5. The image forming apparatus according to claim 1, wherein the reference patch corresponding to the highest density region has a density that is not affected by a difference in a plurality of screen types.

6. The image forming apparatus according to claim 1, wherein, a comparison result between a reference patch formed of a first screen type from among the reference patches of the highest density region and a confirmation patch is shared with a comparison result between a reference patch formed of a second screen type from among the reference patches of the highest density region and a confirmation patch.

7. The image forming apparatus according to claim 1, wherein the confirmation patches have densities that are to be target densities when the reference patches are formed by the forming unit.

8. An image forming method comprising:
forming a set of reference patches including a plurality of reference patches each corresponding to a different one of a plurality of different density regions with a first screen type and forming the set of reference patches with a second screen type different from the first screen type by using a forming unit;
inputting a comparison result between each of the plurality of reference patches included in the set of reference patches formed with the first screen type and a corresponding one of a plurality of confirmation patches, and input a comparison result between each of the plurality of reference patches included in the set of reference patches formed with the second screen type and a corresponding one of the plurality of confirmation patches; and
generating, based on input information, correction information for correcting a density of an image to be formed by the forming unit with the first screen type and correction information for correcting a density of an image to be formed by the forming unit with the second screen type by using a generation unit,
wherein first correction information being information for correcting an image, formed with the first screen type, having a highest density among the plurality of density regions and second correction information being information for correcting an image, formed with the second screen type, having a highest density among the plurality of density regions are each a value generated by the generation unit based on a first comparison result between a reference patch, having the highest density among the plurality of density regions, included in the set of reference patches formed with the first screen type and a corresponding one of the plurality of confirmation patches, and a second comparison result between a reference patch, having the highest density among the plurality of density regions, included in the set of reference patches formed with the second screen type and a corresponding one of the plurality of confirmation patches, and the first correction information and the second correction information are the same.

9. A non-transitory computer readable storage medium storing a program for causing a computer to execute an image forming method, the image forming method comprising:
forming a set of reference patches including a plurality of reference patches each corresponding to a different one of a plurality of different density regions with a first screen type and forming the set of reference patches with a second screen type different from the first screen type by using a forming unit;
inputting a comparison result between each of the plurality of reference patches included in the set of reference patches formed with the first screen type and a corresponding one of a plurality of confirmation patches, and input a comparison result between each of the plurality of reference patches included in the set of reference patches formed with the second screen type and a corresponding one of the plurality of confirmation patches; and
generating, based on input information, correction information for correcting a density of an image to be formed by the forming unit with the first screen type and correction information for correcting a density of an image to be formed by the forming unit with the second screen type by using a generation unit,
wherein first correction information being information for correcting an image, formed with the first screen type, having a highest density among the plurality of density regions and second correction information being information for correcting an image, formed with the second screen type, having a highest density among the plurality of density regions are each a value generated by the generation unit based on a first comparison result between a reference patch, having the highest density among the plurality of density regions, included in the set of reference patches formed with the first screen type and a corresponding one of the plurality of confirmation patches, and a second comparison result between a reference patch, having the highest density among the plurality of density regions, included in the set of reference patches formed with the second screen type and a corresponding one of the plurality of confirmation patches, and the first correction information and the second correction information are the same.

* * * * *